United States Patent [19]

Searfoss et al.

[11] Patent Number: 5,375,327
[45] Date of Patent: Dec. 27, 1994

[54] METHOD OF MANUFACTURING A RECEIVER DRYER

[75] Inventors: Jerry R. Searfoss, Troy; Ronald J. Sievert, Washington, both of Mich.

[73] Assignee: Automotive Fluid Systems, Inc., Troy, Mich.

[21] Appl. No.: 125,920

[22] Filed: Sep. 23, 1993

Related U.S. Application Data

[60] Continuation of Ser. No. 71,246, Jun. 2, 1993, abandoned, which is a division of Ser. No. 877,832, May 1, 1992, Pat. No. 5,245,842.

[51] Int. Cl.$^5$ .................. B23P 15/00; F25B 43/00
[52] U.S. Cl. ..................... 29/890.06; 29/890.035; 62/474
[58] Field of Search ............ 29/890.06, 428, 890.035; 62/85, 474, 475

[56] References Cited

U.S. PATENT DOCUMENTS

| | | | |
|---|---|---|---|
| 3,545,227 | 12/1970 | Grahl | 62/474 |
| 4,611,750 | 9/1986 | Kish | 29/890.06 |
| 4,811,571 | 3/1989 | Mayer | 62/474 |
| 5,038,582 | 8/1991 | Takamatsu | 62/474 |
| 5,075,967 | 12/1991 | Bottom | 29/428 X |
| 5,179,780 | 1/1993 | Winterstern | 62/474 X |

Primary Examiner—Irene Cuda
Attorney, Agent, or Firm—Remy J. VanOphem

[57] ABSTRACT

A receiver dryer for an automobile air conditioning system embodies a cylindrical housing having a spin-closed top end; an inlet tube and an outlet tube inserted in holes drilled in the top end of the housing and both extending through the housing to their respective predetermined positions; and an axially inserted desiccant bag and thermoplastic perforate filter. The outlet tube extends through a hole in the filter to a predetermined position from the bottom end of the housing, and a retainer clip holds the filter at a set position in the housing while the bottom end of the housing is spin-closed. Spin closing the bottom end creates a thermal gradient in the wall of the housing such that the thermoplastic perforate filter is thermally bonded at its edge to irregularities of the inner surface of the housing thereby forming a barrier to any particulates which might otherwise have passed by the filter.

16 Claims, 3 Drawing Sheets

METHOD OF MANUFACTURING A RECEIVER DRYER

This is a continuation of application Ser. No. 08/071,246, filed Jun. 2, 1993 now abandoned; which is a division of application Ser. No. 07/877,832, filed on May 1, 1992, now U.S. Pat. No. 5,245,842.

BACKGROUND OF THE INVENTION

1. Field of the Invention

The present invention relates to receiver dryer devices, particularly for vehicular air-conditioning systems, for separating moisture-laden, partially vaporized refrigerant fluid into a moisture-free refrigerant vapor having a predetermined, specific lubricating oil content.

2. Description of the Prior Art

In most any refrigeration system, and certainly any vehicular air-conditioning system, the use of a receiver dryer at the outlet end of the condenser is an alternative to the use of an accumulator at the outlet end of the evaporator. The receiver dryer receives refrigerant fluid, typically freon-12, at a high pressure (e.g. 200 psig) and high temperature (e.g. 150° F.) and filters any particulates in the fluid and removes any moisture or water which may be present in the refrigerant fluid. At the outlet end of the receiver dryer, the refrigerant fluid is passed through an expansion device or valve and thereby transformed to a vapor of low temperature (e.g. 50° F.) and pressure (e.g. 40 psig), prior to it being passed through the evaporator. Typical examples of such a system are shown in U.S. Pat. Nos. 4,649,719; 5,038,582 and 4,908,132.

Closely related apparatuses are accumulators located downstream of the evaporator and used as an alternative to a receiver dryer, each serving the common purposes of filtering particulates and removing water from the refrigerant and each also acting as a storage reservoir for the refrigerant fluid when the system is disengaged. One example of a highly efficient, fairly economically manufactured receiver dryer is shown in U.S. Pat. No. 4,675,971 assigned to the assignee of the present invention, wherein a cylindrical, aluminum housing is completely closed at its bottom end by a spinning operation, is loaded with a desiccant material and perforate disc-shaped member, and then capped with a top containing inlet and outlet tubular members.

The present invention maintains the functional efficiency of such known devices, but includes fewer components and a simplified and more reliable method of manufacture.

SUMMARY OF THE INVENTION

The present invention contemplates a receiver dryer member for a refrigeration system, particularly a vehicular air-conditioning system, of the simplest construction and containing a minimum number of components, yet being the full, functional equivalent of known receiver dryer devices.

The invention further contemplates a receiver dryer member as described above, having enhanced reliability resulting from its simplistic structure and method of manufacture.

The invention further contemplates a receiver dryer constructed in such manner that the final manufacturing step of spin closing the bottom open end of the receiver dryer housing generates sufficient heat to thermally form the thermoplastic perforate particulate filtering element to the housing and thereby also provide an ideal seal between the filter element and dryer housing where desired.

The invention further contemplates a receiver dryer structure and method of manufacture whereby the use of a desiccant material containing cartridge, which may optionally include in combination a particulate filter element, is facilitated.

DETAILED DESCRIPTION OF THE PREFERRED EMBODIMENT

Figure 1:
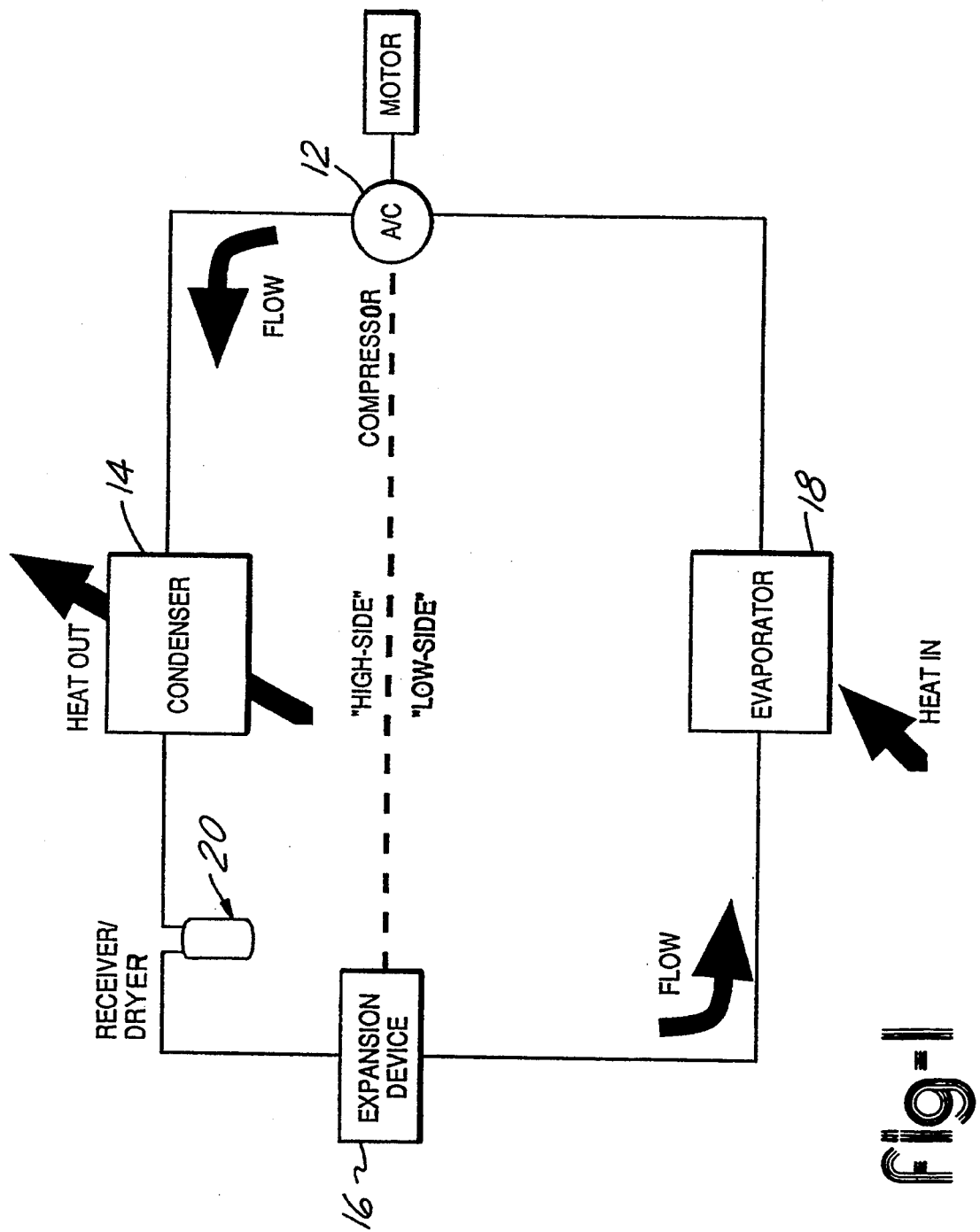
FIG. 1 is a schematic representation of a typical vehicular air-conditioning system incorporating use of a receiver dryer as may be designed pursuant to the present invention.

Referring to FIG. 1, there is a schematic of a generally conventional vehicular air-conditioning system including a compressor 12, condenser 14, expansion device 16, evaporator 18 and a receiver dryer generally designated 20. A refrigerant fluid, such as freon-12 or the like, is circulated through the system beginning as a high temperature/high pressure vapor on the outboard side of the compressor 12, then passing through the condenser 14, during which time additional heat is taken out of the vapor forming a high temperature/high pressure liquid, then passing through the receiver dryer constructed in accordance with the present invention, then passing through the expansion device or orifice tube 16 such as that which is commonly termed an "H" valve causing thermal expansion of the refrigerant and thereby producing a low temperature/low pressure vapor/liquid stream passing through the evaporator 18 which takes in heat from the heated vehicular passenger compartment and transforming the refrigerant to a low temperature/low pressure vapor.

As shown in FIGS. 1 through 4, the receiver dryer 20 of the present invention includes a cylindrical tubular housing 22 which is spun closed at both ends as indicated by dimples 24 located on the longitudinal axis 26 of the housing member and formed as a result of the spinning operation. Preferably, an aluminum alloy such as 6066 T6 or its equivalent is used, which is readily adaptable to the manufacturing techniques discussed in detail below and provides a lightweight component which is of great demand in the automotive industry. An inlet tube 28 and an outlet tube 30 extend through the top end wall 32 of the receiver d to different points within a chamber 34 defined by the housing enclosure. Both the inlet and outlet tube are disposed parallel to the longitudinal axis 26 of the housing and the longitudinal axis of each is located on a common centerline 36. The outlet tube 30 extends to the bottom or opposite end 38 of the housing and includes a discharge end 40 located at a predetermined distance from the bottom of the housing. The inlet tube 28 includes a discharge end 42 which is located near the uppermost regions of the chamber 34. Within the chamber 34 of the receiver dryer housing is located a desiccant material containing member 50. Conventionally, such a member would include a flexible perforate cloth bag 52 filled with granules 54 of silica gel or calcium chloride. The desiccant material containing member is supported within the chamber 34 by a perforate thermoplastic filter element 60 made of sintered polypropylene pellets 62 or equivalent material such as high-density polyethylene, ultra high molecular weight polyethylene, polypropylene, polyvinylidene fluoride, ethylene-vinyl acetate, polytetrafluoroethylene, styrene-acrylonitrile, or nylon.

Figure 4:
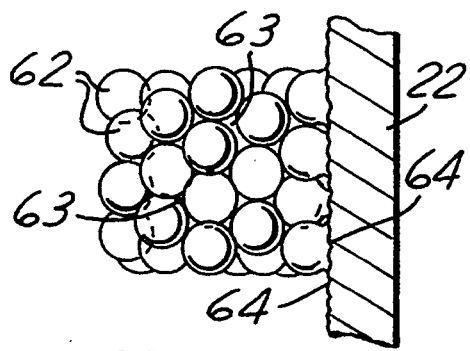
FIG. 4 is an enlarged cross-sectional view of the encircled area designated 4 in FIG. 2.

As seen in FIG. 4, the interstices 63 between the sintered pellets 62 form a tortuous flow path for refrigerant fluid and provide an effective filter for catching any particulates. Generally, the filter element 60 may be produced with an effective sieve size ranging from about 10 microns to about 100 microns. For most automotive air conditioning systems, a design specification of about 15 microns is preferred, i.e. particulates 15 microns and larger are precluded from passing through the filter.

Figure 2:
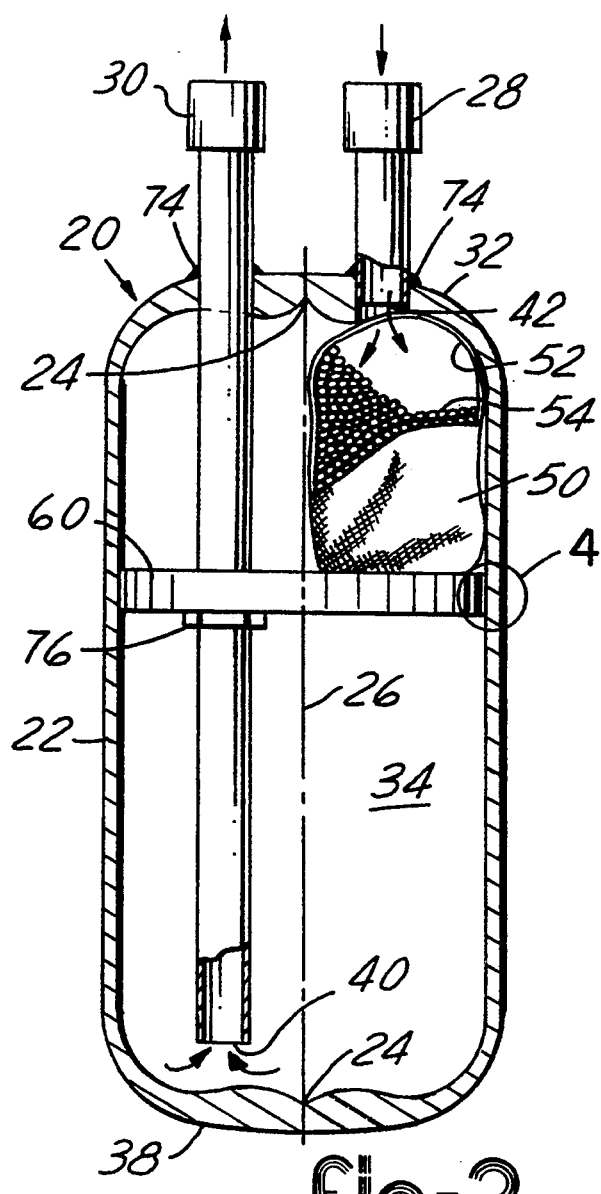
FIG. 2 is an elevational view of the present invention shown partially in cross section taken along section lines 2—2 of FIG. 3.
Figure 3:
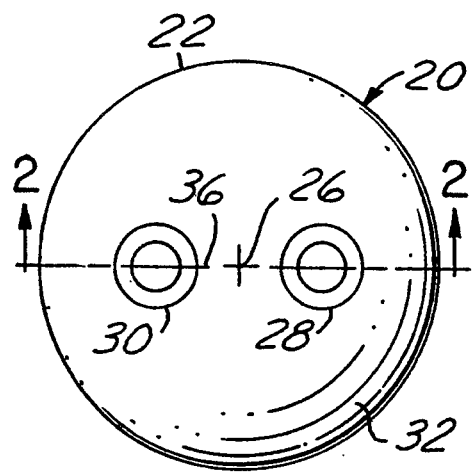
FIG. 3 is a plan view of the present invention.
Figure 5:
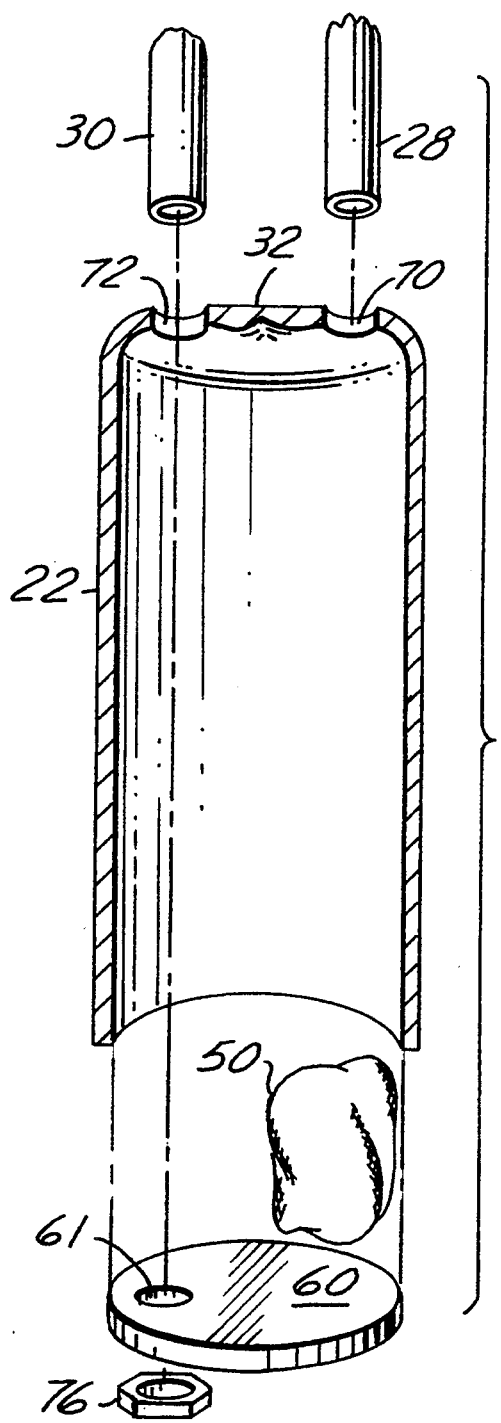
FIG. 5 is an exploded view of the receiver dryer as shown in FIGS. 2 and 3.

As seen best in FIGS. 2 and 5, the inlet and outlet tubes 28 and 30 extend through the respective inlet and outlet ports 70 and 72 and upon being positioned for their respective lengths are brazed to the housing as indicated at 74.

The filter element 60 may temporarily be maintained in place on the outlet tube by means of a one-way slip fit-type lock washer 76 as shown in FIGS. 2 and 5. However, as explained in detail below, the permanent position of the filter element 60 relative to the housing is maintained by means of thermally forming the filter element to the internal wall of the housing. The necessary heat to partially melt or soften the filter at the interface in contact with the internal housing wall is generated during the final assembly step of spin closing the bottom end 38 of the housing. This spin closing step generates conductive heat in the housing wall in the area of the filter element in the order of 300° F. to about 400° F., whereas the temperature at the bottom end 38 may be about 1100° F.

It will be noted from the enlarged view of FIG. 4 that the housing internal wall includes numerous surface irregularities 64. These are normal irregularities produced during forming, as by extruding, the cylindrical housing. As the housing is spun to close off the bottom end 38, the outer rim portion of the filter element 60, softened by the conductive heat of the spin closing step, is caused to centrifugally flow into these surface irregularities 64, completely filling them and thereby fixing the position of the filter element 60 to the housing by this thermal forming operation and providing a complete and ideal seal at the thermally formed interface of the filter and housing.

Figure 6:
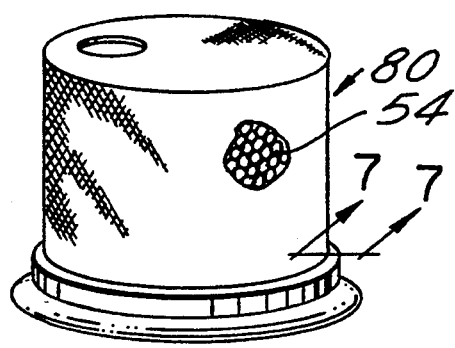
FIG. 6 is a perspective view shown partially in section of a desiccant material containing and particulate filter combination cartridge unit of known construction suitable for use with the present invention.
Figure 7:
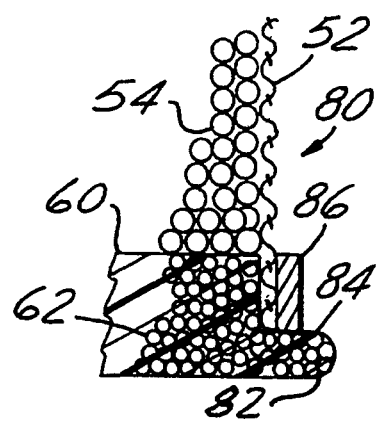
FIG. 7 is a partial cross-sectional view taken along section lines 7—7 of FIG. 6.

As shown in FIG. 5, the dual component combination of the desiccant material containing member or bag 50 and the thermoplastic particulate filter element 60 can be replaced by a combination cartridge unit 80 such as shown in FIG. 6.

The cartridge unit 80 includes the annular disc like filter 60 previously described and an annular bead or rim portion 82. The rim portion 82 defines a shoulder 84 with the upper end of the filter over which a retainer ring 86 may be press-fitted to retain therebetween a portion of the perforate filter bag 52 thereby retaining the desiccant granules 54. Alternatively, the construction of the cartridge 80 may be conventional and represent no part of the present invention except to the extent that it includes an outer plastic rim portion selected of a material such as polypropylene or other similar material described above, so that the seal and thermally formed bond at the annular rim portion 82 of the cartridge unit will be established during the spin closing of the bottom end 38 of the housing.

Figure 8:
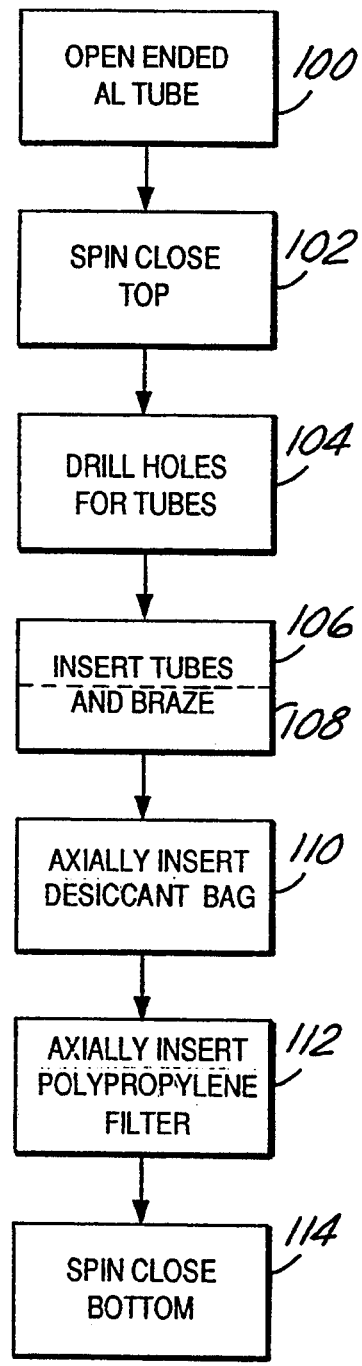
FIG. 8 is a schematic block diagram of the method of manufacture of the receiver dryer in accordance with the present invention.

As shown schematically in FIG. 8 the process or method of manufacture of the receiver dryer in accordance with the present invention includes the following steps:

100. selecting an open-ended aluminum cylindrical tube of 6063 T6 aluminum material or equivalent;

102. spin closing one end of the housing, the spin closing technique being conventional in the art as taught in U.S. Pat. No. 4,675,971, for example the disclosure of which is hereby incorporated by reference;

104. drilling inlet and outlet ports 70 and 72 in the spin-closed end of the housing to the same size of the outer diameter of the inlet and outlet tubes 28 and 30, respectively;

106. inserting inlet and outlet tubes through their respective inlet and outlet ports, and fixing them at the relative length established for the discharge end of each;

108. brazing each tube at 74 to the top end wall 32 of the housing;

110. axially inserting a desiccant material containing member 50 to a point in proximity with the discharge end of the inlet tube 28;

112. axially inserting an annular polypropylene, or similar, perforate filter element 60 within the chamber until the point approximately mid-way of the longitudinal axis of the chamber 34 defined by the housing, with the filter element including a slot or hole 61 allowing it to slide upon one length of the outlet tube and optionally temporarily secured thereto by means of a mechanical fastener, such as a push-on type, one-way locking washer member 76;

114. finally, spin closing the remaining open end of the housing and generating sufficient heat within the housing as a result of the spinning operation, on the order of 300° F. to about 400° F. at the filter element 60, to thermally and centrifugally form and thereby bond and seal the annular outer rim 82 of the filter element 60 to the internal wall surface of the housing 22 using the spin closing technique as applied to closing the other end of the housing (step b.)

Although particular embodiments of the present invention have been illustrated in the accompanying drawings and described in the foregoing detailed description, it is to be understood that the present invention is not to be limited to just the embodiments disclosed. Numerous rearrangements, modifications and substitutions are possible, without departing from the scope of the claims hereafter.

What is claimed is:

1. A method of making a receiver dryer for use in an air conditioning system to dehydrate a refrigerant fluid and filter from said refrigerant fluid particulates potentially harmful to said air conditioning system, said method comprising the steps of:

providing an elongate cylindrical housing member having a closed end and an open end, said cylindrical housing member having an inlet tube and an outlet tube connected to said closed end, one of said inlet and outlet tubes terminating at said closed end and the other of said inlet and outlet tubes extending in a direction towards said open end of said cylindrical housing member;

inserting in said cylindrical housing member in said open end a perforate disk-shaped thermoplastic filter member comprised of sintered plastic pellets and having interstices therein for filtering said particulates from said refrigerant fluid; and closing said open end of said cylindrical housing member and concurrently generating sufficient heat such that said thermoplastic filter member conforms and adheres to said cylindrical housing member, whereby said refrigerant fluid being circulated through said receiver dryer is forced to flow through said thermoplastic filter member, thereby removing said particulates from said air conditioning system.

2. The method of claim 1 further comprising the step of:

inserting a means for dehydrating said refrigerant fluid in said cylindrical housing member before said step of inserting said perforate disk-shaped thermoplastic filter member.

3. The method of claim 1 further comprising the step of:

inserting a means for dehydrating said refrigerant fluid in said cylindrical housing member after said step of inserting said perforate disk-shaped thermoplastic filter member.

4. The method of claim 1 wherein said step of providing an elongate cylindrical housing member further comprises the step of providing an aluminum alloy elongate cylindrical housing member.

5. The method of claim 1 further comprising the step of selecting a perforate thermoplastic filter member comprised of sintered pallets defining interstices having an equivalent sieve size ranging in size from about 10 microns to about 100 microns.

6. A method of making a receiver dryer for use in an air conditioning system to dehydrate a refrigerant fluid and filter particulates from said refrigerant fluid, said method comprising the steps of:

providing an elongate cylindrical housing member having a closed end and an open end, said cylindrical housing member having an inlet tube and an outlet tube connected to said closed end, one of said inlet and outlet tubes terminating at said closed end and the other of said inlet and outlet tubes extending in a direction towards said open end of said cylindrical housing member;

inserting in said cylindrical housing member through said open end a perforate disk-shaped thermoplastic filter member comprised of sintered plastic pellets and having interstices therein for filtering said particulates from said refrigerant fluid; and closing said open end of said cylindrical housing member and concurrently generating sufficient heat such that said thermoplastic filter member conforms and adheres to said cylindrical housing member, whereby said refrigerant fluid being circulated through said receiver dryer is forced to flow only through said thermoplastic filter member thereby removing said particulates from said refrigerant fluid of said air conditioning system.

7. The method as set forth in claim 6 wherein said step of providing an elongate cylindrical housing member further comprises the step of selecting an aluminum alloy elongate cylindrical housing member.

8. The method as set forth in claim 6 further comprising the step of selecting a perforate thermoplastic filter member comprised of sintered pellets defining interstices having an equivalent sieve size ranging in size from about 10 microns to about 100 microns.

9. The method of claim 6 further comprising the step of:

inserting a means for dehydrating said refrigerant fluid in said cylindrical housing member before said step of inserting said perforate disk-shaped thermoplastic filter member.

10. The method of claim 6 further comprising the step of:

inserting a means for dehydrating said refrigerant fluid in said cylindrical housing member after said step of inserting said perforate disk-shaped thermoplastic filter member.

11. A method of making a receiver dryer for use in an air conditioning system to dehydrate a refrigerant fluid and filter from said refrigerant fluid particulates potentially harmful to said air conditioning system, said method comprising the steps of:

making a cylinder of a predetermined length, said cylinder having a first end, a second end, an inner wall and a longitudinal center axis, said cylinder having a first axis located on said longitudinal center axis of said cylinder;

spinning said cylinder about said first axis;

forming said first end of said cylinder while said cylinder is spinning such that said first end of said cylinder is completely closed;

inserting in said cylinder through said second end a perforate disk-shaped thermoplastic filter comprised of sintered plastic pellets and having interstices therein for filtering said particulates from said refrigerant fluid;

forming said second end of said cylinder while said cylinder is spinning such that said second end of said cylinder is completely closed; and sealing said perforate disk-shaped thermoplastic filter to adhere to said inner wall of said cylinder, whereby said refrigerant fluid being circulated through said receiver dryer is forced to flow through said perforate disk-shaped thermoplastic filter, thereby removing said particulates which might otherwise be harmful to said air conditioning system.

12. The method of claim 11 wherein said step of forming said second end and said step of sealing said perforate disk-shaped thermoplastic filter occur concurrently and said disk-shaped thermoplastic filter conforms and adheres to said inner wall of said cylinder.

13. The method of claim 11 further comprising the step of positioning said perforate disk-shaped thermoplastic filter in a plane substantially perpendicular to said first axis of said cylinder and in interference fit with said inner wall of said cylinder.

14. The method of claim 11 further comprising the step of placing a dehydrating means within said cylinder.

15. The method of claim 11 wherein said step of extruding a cylinder of predetermined length further comprises the step of selecting an aluminum alloy material to be extruded.

16. The method of claim 11 further comprising the step of selecting a perforate disk-shaped thermoplastic filter comprised of sintered pellets defining interstices having an equivalent sieve size ranging in size from about 10 microns to about 100 microns.

* * * * *

UNITED STATES PATENT AND TRADEMARK OFFICE
CERTIFICATE OF CORRECTION

PATENT NO. : 5,375,327
DATED : December 27, 1994
INVENTOR(S) : Jerry Searfoss and Ronald Sievert It is certified that error appears in the above-indentified patent and that said Letters Patent is hereby corrected as shown below:

```
Column 2, line 61, delete "6066" insert ---- 6063 ----.

Column 2, line 66, delete "d" insert ---- dryer ----.

Column 5, line 43, delete "pallets" insert ---- pellets ----.

Column 7, line 1 and 2, delete "extruding" insert ---- making
----.
```

Signed and Sealed this

Twenty-fifth Day of July, 1995

Attest:

BRUCE LEHMAN

*Attesting Officer*   *Commissioner of Patents and Trademarks*